(12) United States Patent
Koenig et al.

(10) Patent No.: US 8,118,136 B2
(45) Date of Patent: Feb. 21, 2012

(54) LAMINATED PERFORATED ACOUSTICAL FOAM

(75) Inventors: Jean-Francois Koenig, Strasbourg (FR); Fernand Wilhelm, Sessenheim (FR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/061,321

(22) PCT Filed: Sep. 18, 2009

(86) PCT No.: PCT/US2009/057398
§ 371 (c)(1),
(2), (4) Date: Feb. 28, 2011

(87) PCT Pub. No.: WO2010/036562
PCT Pub. Date: Apr. 1, 2010

(65) Prior Publication Data
US 2011/0232993 A1    Sep. 29, 2011

Related U.S. Application Data

(60) Provisional application No. 61/100,830, filed on Sep. 29, 2008.

(51) Int. Cl.
*E04B 1/84* (2006.01)
(52) U.S. Cl. .................... 181/294; 181/292; 181/290
(58) Field of Classification Search .................. 181/290, 181/292, 293
See application file for complete search history.

(56) References Cited

U.S. PATENT DOCUMENTS

| | | | | |
|---|---|---|---|---|
| 4,097,633 A * | 6/1978 | Focht | ............... | 428/138 |
| 4,128,683 A * | 12/1978 | Nomura et al. | ............... | 428/138 |
| 4,219,376 A * | 8/1980 | Roman | ............... | 156/209 |
| 4,851,274 A * | 7/1989 | D'Elia | ............... | 428/113 |
| 5,125,475 A * | 6/1992 | Ducharme et al. | ............ | 181/284 |
| 5,512,715 A * | 4/1996 | Takewa et al. | ............... | 181/295 |
| 5,585,058 A | 12/1996 | Kolosowski | | |
| 5,776,390 A | 7/1998 | Fiddelaers et al. | | |
| 6,092,622 A * | 7/2000 | Hiers et al. | ................ | 181/290 |
| 6,109,389 A * | 8/2000 | Hiers et al. | ................ | 181/290 |
| 6,207,254 B1 | 3/2001 | Lee et al. | | |
| 6,264,872 B1 * | 7/2001 | Majors et al. | ................ | 264/284 |
| 6,279,738 B1 | 8/2001 | Mungo et al. | | |
| 6,345,688 B1 * | 2/2002 | Veen et al. | ................ | 181/290 |
| 6,454,981 B1 | 9/2002 | Lee et al. | | |
| 6,583,193 B2 | 6/2003 | Park et al. | | |
| 6,720,362 B1 * | 4/2004 | Park | ................ | 521/79 |
| 6,720,363 B2 | 4/2004 | Subramonian et al. | | |
| 2003/0143373 A1 | 7/2003 | Bledsoe et al. | | |

FOREIGN PATENT DOCUMENTS

| | | |
|---|---|---|
| EP | 1276796 | 1/2003 |
| JP | 46-25639 | 7/1971 |
| JP | 56008237 | 1/1981 |
| JP | H4-307227 | 10/1992 |
| WO | 0170859 | 9/2001 |
| WO | 0170860 | 9/2001 |
| WO | 02098963 | 12/2002 |
| WO | 2007069990 | 6/2007 |
| WO | 2007086041 | 8/2007 |

* cited by examiner

*Primary Examiner* — Forrest M Phillips
(74) *Attorney, Agent, or Firm* — Steven W. Mork

(57) ABSTRACT

Prepare an acoustical polymeric foam by providing at least two initial polymeric foams, perforating all the way through the initial polymeric foams and then laminating the perforated initial foams together such that a perforated surface of one foam adheres to a perforated surface of an adjoining perforated initial foam.

9 Claims, 1 Drawing Sheet

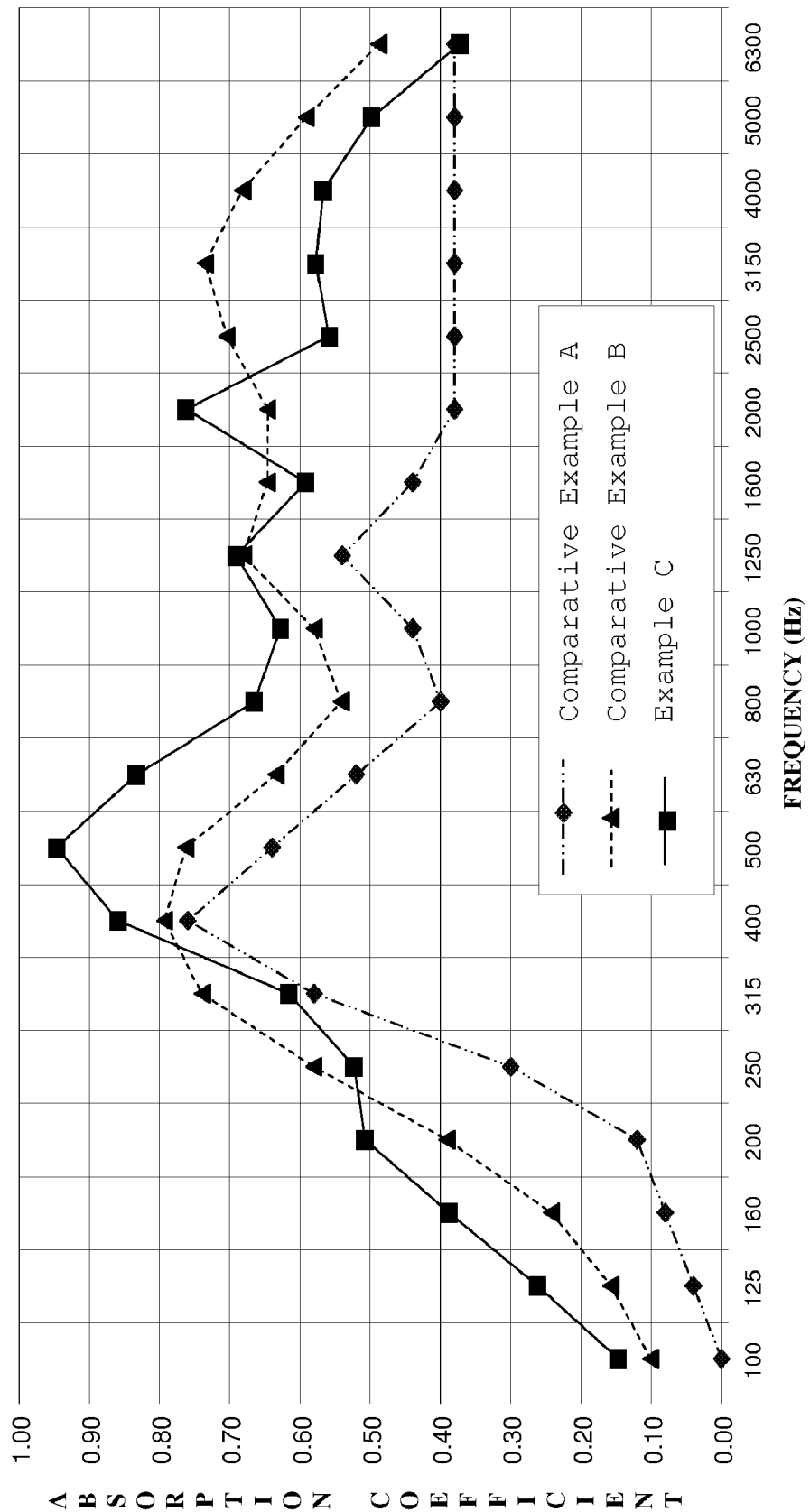

LAMINATED PERFORATED ACOUSTICAL FOAM

CROSS REFERENCE STATEMENT

This application claims the benefit of U.S. Provisional Application No. 61/100,830, filed Sep. 29, 2008.

BACKGROUND OF THE INVENTION

1. Field of the Invention

The present invention relates to polymeric foam useful for acoustical attenuation.

2. Description of Related Art

There is a desire to increase efficiency in terms of cost and time of producing thick foam useful for acoustical attenuation (acoustical foam) production. Time and cost tends to increase dramatically as the thickness of the foam increases because production becomes more complicated. The primary difficulty with increasing the thickness of an acoustical foam is in the step of perforating the foam.

Acoustical foams are often perforated to facilitate blowing agent dissipation and to reduce airflow resistivity. Blowing agent dissipation is desirable to exchange blowing agent that may be flammable or otherwise undesirable with air. See, for example, U.S. Pat. No. 5,585,058. Acoustical foams also presumably require a substantially open-cell structure and a relative low airflow resistivity to be acoustically active (see, for example, U.S. Pat. No. 6,720,362 at column 1, lines 41-44 and column 10, lines 29-31, cited portions incorporated herein by reference).

Perforating foam becomes increasingly difficult as foam thickness increases. Rollers containing spikes can be suitable for perforating thin foams by rolling the spikes over the foam and impressing the spikes into the foam. Such a technique becomes problematic with thicker foams if perforations are to achieve appreciable depth. Perforating an appreciable distance into thick foams requires relatively long spikes or needles. Rolling long spikes into a foam tends to tear the foam as the spikes enter and exit the foam. Therefore, perforating thick foams typically requires impaling the foam in a single direction onto a bed of needles (or needles into the foam) and then drawing the needles out from the foam in the same direction. It is difficult to incorporate such a perforation procedure into a continuous process so efficiency decreases in regards to time of manufacturing. Moreover, the cost of equipment for impaling foam with a bed of needles tends to be as much as ten times that of a roller containing spikes. Therefore, efficiency decreases from a cost perspective as well.

Blowing agent dissipation also becomes more problematic as foam thickness increases. Perforation channels, through which blowing agent travels to escape from cells internal to a foam, become longer and more tortuous as foam thickness increases. Gas takes longer to permeate through a longer more tortuous channel than a shorter less tortuous channel. Thicker foams require longer perforation channels to reach internal cells. As a result, the longer the perforation channel, the longer it takes for the blowing agent to find its way out of the foam. Hence, even when perforated, thicker foams tend to suffer from slower blowing agent dissipation than thinner foams that are perforated. The slower the dissipation of blowing agent, the longer the foam must be stored before selling. As a result, slow blowing agent dissipation is undesirably costly in time and money.

Despite drawbacks to preparing thicker foams, increasing the thickness of foam is desirable. Increasing foam thickness tends to increase the acoustical dampening ability of the foam, particularly in low frequency ranges.

It is desirable to be able to increase the thickness of acoustical foam without having to experience the difficulties in perforating the foam and dissipating the blowing agent typically associated with thicker acoustical foams while maintaining or improving acoustical activity of the polymeric foam.

BRIEF SUMMARY OF THE INVENTION

The present invention provides a process for preparing acoustical foam of a given thickness with the perforation and blowing agent dissipation efficiency of thinner foam. A surprising result of the present invention is that perforated acoustical foams can be laminated together to form a thicker acoustical foam that achieves similar acoustical properties to a non-laminated perforated foam of similar thickness. The result is surprising in view of the fact that perforation channels of a first perforated foam are unlikely to align perfectly with perforation channels of a second perforated foam that is laminated to the first perforated foam. As a result, the airflow resistivity through a laminated foam should be noticeably higher than the airflow resistivity through a non-laminated perforated foam of the same thickness. Based on prior knowledge, one would then expect the laminated foam to have a lower acoustical activity than the non-laminated foam. Acoustical foams of the present invention illustrate that this expected result is not the case.

Even more surprising is the fact that the present invention can achieve these results from a foam having an open cell content of less than 30%, even a foam having an open cell content of less than 10%.

In a first aspect, the present invention is a method for preparing acoustical foam comprising the following steps: (a) providing at least two initial polymeric foams, each having opposing major surfaces; (b) perforating the initial polymeric foams through one major surface all the way the foam and through the opposing major surface to form perforated polymeric foams having perforation channels that extend in a continuous and linear fashion all the way through the perforated polymeric foam; and (c) laminating the perforated polymeric foams together such that a perforated surface of one perforated polymeric foam adheres to a perforated surface of another perforated polymeric foam.

Desirable embodiments of the first aspect include any one or combination of more than one of the following characteristics: the perforated polymeric foams have an average cell size of at least four millimeters according to ASTM D3576; the polymeric foams have an open cell content of less than 30 percent according to ASTM method D6226-05; the initial polymeric foams each have a thickness of 30 millimeters or less; step (b) comprises compressing the initial polymeric foams into a compressed state and then perforating the initial polymeric foams while in a compressed state, especially wherein perforating occurs by applying a roller with multiple spikes extending off from the roller into each initial polymeric foam such that the spikes penetrate through the initial polymeric foam as the initial polymeric foam travels under the roller, and even more preferably wherein the roller has a pre-perforated foam side and a perforated foam side and a reed of rods ejects the perforated foam from the spikes by comprising rods that extend up to the roller from the perforated foam side and reside between the roller and perforated polymeric foam; step (b) introduces perforations sufficient to produce a perforated polymeric foam has a perforation density of at least 0.8 perforations per square centimeter of perforated major surface; the perforation density is two perforations or less per square centimeter of perforated major surface; and step (c) comprises heating one or both major surfaces being adhered together sufficiently to soften the perforated polymeric foam at the surface or surfaces and then contacting the major surfaces of the perforated polymeric foams together, particularly wherein step (c) comprises melt welding the perforated polymeric foam major surfaces together in an absence of any adhesive between perforated surfaces of the perforated polymer foams other than the softened polymer composition of one or more of the perforated polymer foams.

In a second aspect, the present invention is an acoustical foam comprising two or more perforated polymeric foams having opposing perforated surfaces with at least one perforated surface laminated to a perforated surface of another perforated polymeric foam, wherein each perforated polymeric foam comprises perforations that extend in a continuous linear fashion through the entire perforated polymeric foam, yet fewer than all of the perforation channels in any perforated polymeric foam extend in a continuous linear fashion without restriction all the way through the acoustical polymeric foam.

Desirable embodiments of the second aspect include any one or combination of more than one of the following characteristics: the perforated polymeric foams have an average cell size of at least four millimeters according to ASTM D3576; and the perforated polymeric foams have a perforation density of at least 0.8 perforations per square centimeters of perforated polymeric foam major surface, especially wherein at least one of the polymeric foams has a perforation density of two perforations per square centimeter or less The process of the present invention is useful for preparing acoustical polymeric foam of the present invention. The acoustical polymeric foam of the present invention is useful for use as an acoustical dampening material in applications such as vehicles, buildings, and machinery.

BRIEF DESCRIPTION OF THE DRAWINGS

FIG. 1 illustrates acoustical performance spectra for Comparative Examples A and B and Example 1.

DETAILED DESCRIPTION OF THE INVENTION

ASTM refers to American Society for Testing and Materials. ASTM test methods either specify the year of the test method using a hyphenated suffix or correspond to the most recent test method as of the priority date for this document.

"Acoustically active" in reference to a polymeric foam refers to a foam having a noise reduction coefficient (NRC) of 0.3 or greater according to the testing procedure of ASTM method C423. "Acoustically active polymeric foam", "acoustical polymeric foam" and "acoustical foam" are all synonymous within this document.

"Primary surface" of a polymeric foam is a surface having a planar surface area equal to the largest planar surface area of any surface of the polymeric foam. A planar surface area is the area of a surface as projected onto a plane and corresponds to the surface area of the surface as though the surface was perfectly flat.

"Major surface" of a polymeric foam is a primary surface of the foam as well as a surface opposing the primary surface. Both major surfaces may be primary surfaces, but only one necessarily is a primary surface.

"Thickness" of a polymeric foam is the distance between major surfaces of the foam extending perpendicular to a primary surface of the foam.

"Perforation density" corresponds to the number of perforations in a given surface area of a foam surface, typically in a major surface of the foam.

"Perforation channel" corresponds to the passageway formed in a polymeric foam upon perforating the polymeric foam.

The process of the present invention comprises providing at least two initial polymeric foams, each having opposing major surfaces. The process includes perforating the initial polymeric foams to form perforated polymeric foams. The initial polymeric foams and perforated polymeric foams are similar in properties such as composition, average cell size, and thickness. The difference between the initial polymeric foams and perforated polymeric foams is only the greater extent of perforation in the perforated polymeric foam. Therefore, the following foam properties for "polymeric foam" apply to both initial polymeric foams and perforated polymeric foams, as well as acoustical foams of the present invention, unless otherwise noted.

Polymeric foams comprise a polymer matrix with cells dispersed therein. The polymer matrix contains a polymer composition that forms a continuous phase in the polymer matrix. The polymer composition can be either thermoplastic, thermoset or a combination of thermoplastic and thermoset in character. Desirably the polymer composition is primarily thermoplastic meaning that, greater than 50 percent by weight (wt %), preferably 75 wt % or more, still more preferably 90 wt % or more and possibly 100 wt % of the polymer is thermoplastic based on total weight of polymer composition.

Desirable thermoplastic polymers include polymers of alkenyl aromatic monomers (alkenyl aromatic polymers), polymers of olefins (polyolefins), and blends thereof. Particularly desirable alkenyl aromatic polymers include styrenic homopolymers and copolymers (jointly referred to as "polymers") and blends thereof. Exemplary alkenyl aromatic polymers include polystyrene homopolymer and styrene-acrylonitrile copolymer. Exemplary polyolefins include propylene polymers and ethylene polymers and blends thereof.

In one desirable embodiment, the polymer composition of at least one and preferably each initial polymeric foam is 90 wt % or more ethylene homopolymer based on polymer composition weight.

In one desirable embodiment, the polymer composition of at least one and preferably each initial polymeric foam is selected form one or a combination of more than one of ethylene homopolymer, propylene homopolymer and ethylene/propylene copolymer.

The polymer matrix can comprise additives in addition to the polymer composition. Additives are generally dispersed within the polymer composition that makes up the polymer matrix. Acceptable additives include any one or any combination of more than one of the following: infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as brominated polymers, hexabromocyclododecane, phosphorous flame retardants such as triphenylphosphate, and flame retardant packages that may including synergists such as, or example, dicumyl and polycumyl); lubricants (for example, calcium stearate and barium stearate); acid scavengers (for example, magnesium oxide and tetrasodium pyrophosphate); colorants; and pigments For optimal acoustical dampening properties, the initial polymeric foams desirably have an average cell size that is two millimeters or larger, preferably three millimeters or larger, still more preferably four millimeters or larger, yet more preferably six millimeters or larger and can be seven millimeters or larger. The average cell size of a polymeric foam is necessarily smaller than the thickness of the foam and is typically twelve millimeters or smaller, and often is ten millimeters or smaller. Larger cell sizes are desirable to allow sufficient air movement within cells to accommodate and dampen compressive waves associated with acoustics. Moreover, larger cells can accommodate more than one perforation if the perforation density is high enough and accommodating more than one perforation channel in a single cell couples the perforation channels and allows compressive motion of air within the cell to propagate into both perforation channels. Determine average cell size using the general procedure of ASTM D3576.

Initial polymeric foams can have any amount of open cell content, including 0%, 100% and any amount in between. Generally, initial polymeric foams have an open cell content of 30% or less, more typically 20% or less, 10% or less, even 5% or less or 0% open cell content. Determine percent open cell content according the to the general procedure of ASTM method D6226-05.

Both the initial and perforated polymeric foams are thinner than the acoustical foam of the present invention and, thereby, provide a desirable benefit in preparing the acoustical foams of the present invention. Thinner polymeric foams advantageously exchange blowing agent from within cells with air faster than thicker polymeric foams. Often, acoustical polymeric foams are prepared with flammable blowing agents and need to be "cured" to allow air to exchange with blowing in the cells. Curing requires storing the polymeric foams at an elevated temperature until the blowing agent/air exchange is complete. Perforating a polymeric foam accelerates the blowing agent/air exchange. Reducing the thickness of a polymeric foam also accelerates the blowing agent/air exchange and facilitates perforating the foam by allowing roller perforation techniques that are not applicable to thicker foams. The process of the present invention advantageously benefits from a rapid curing rate and ease of perforation associated with thin polymeric foams while enjoying the benefit of producing thick acoustical polymeric foam. Initial and perforated polymeric foams desirably have a thickness of 30 millimeters (mm) or less, preferably 20 mm or less and most preferably 10 mm or less. Generally, though not necessarily, the initial and perforated polymeric foams have a thickness of one millimeter or more.

The present process requires perforating the initial polymeric foam to prepare a perforated polymeric foam. The initial polymeric foams may contain perforations, but typically are free of perforations. In either case, the perforated polymeric foam comprises more perforations than the initial polymeric foam.

Any perforation technique known or later developed that is capable of perforating polymeric foam is suitable for perforating the initial polymeric foams. Perforation techniques include applying a roller containing needles over or under a polymeric foam, introducing a bed of needles into a polymeric foam and then separating the needles from the polymeric foam, or subjecting a polymeric foam to one or a series of needles that repeatedly insert and retract from a polymeric foam as the foam travels under the needles (sewing machine technique). Perforation depth is desirably all the way through an initial foam (through both opposing major surfaces). Desirably, most (more than 50%) of the perforations extend all the way through the perforated foam and typically all of the perforations extend all the way through the perforated polymeric foam. A particular perforation channel extends to its perforation depth in a continuous linear fashion into a perforated polymeric foam.

One desirable perforation technique ("roller technique") is to direct an initial polymeric foam under a roller that has spikes (needles) extending out from the roller so when the foam travels under the roller the spikes perforate the initial polymeric foam, typically through a major surface. It is yet more desirable if the roller simultaneously compresses the initial polymeric foam as it perforates it, thereby reducing the length of needle necessary to extend into or through the initial polymeric foam. The amount of spikes and location of spikes on the roller dictates a perforation pattern and perforation density in the resulting perforated polymeric foam. The perforation pattern can have a uniform perforation density or a non-uniform perforation density. Desirably, the roller extends and compresses all the way across the initial polymeric foam. It is further desirable that the roller applies perforations in a variety of locations all across the initial polymeric foam.

When using a roller technique to perforate an initial foam it is desirable to use an ejection device to separate the perforated foam from the spikes (or needles) after perforation. The roller containing spikes has a pre-perforated foam side and a perforated foam side. The pre-perforated foam side is the side that initial foam approaches the roller. The perforated foam side is the side that the perforated foam exits from under the roller. It is desirable to position an ejection device on the perforated foam side of the roller in a manner such that at least a portion of the ejection device extends up to the roller between the roller and perforated foam. The ejection device then serves to separate (eject) the perforated foam from the spikes on the roller as it exits from under the roller. A particularly desirable ejection device is a reed comprising multiple rods, preferably metal rods, that extend between rows of spikes on the roller to a position between the perforated foam exiting from under the roller and the roller itself. The reed is desirably at least as wide as the perforated polymeric foam that it separates from the roller to efficiently separate the perforated polymeric foam from the spikes on the roller.

Herein, reference to "under the roller" is relative and non-limiting, which means that it can equally mean "above the roller" if perforation occurs by passing an initial foam over a roller with spikes. Moreover, the teachings equally apply to a method of perforating initial foam by perforating through a foam with rollers containing spikes above and below the foam as well as perforating multiple foams with a single roller containing spikes by passing the foams above and below the same roller.

An advantage of the process of the present invention over other methods of preparing an acoustical foam of thickness is that acoustical foams of substantial thickness can be made using time and cost efficient perforation techniques that are unsuitable for thicker foams. For example, a roller-type perforating apparatus is useful for thin foams but is unsuitable for thick foams. Yet the roller-type perforating apparatus can cost one tenth the price of equipment for employing a sewing machine type perforation process that is suitable for thick foams.

Perforation density is a measure of the number of perforations per unit area of perforated surface, typically perforated major surface. Perforated polymeric foams of the present invention desirably have a perforation density of at least 0.8 perforation per square centimeter of perforated surface.

Increasing the perforation density generally increases both the rate of blowing agent/air exchange of the perforated polymeric foam and the acoustical properties of the acoustical polymeric foam. Desirably perforation densities include one perforation or more, preferably 1.25 perforations or more, still more preferably 1.5 perforation or more and yet more preferably two perforations or more per square centimeter of perforated surface. An upper limit on perforation density is primarily dependent upon technical limitations rather than performance limitations. Nonetheless, perforated polymeric foams for use in the present process generally have a perforation density of three perforations per square centimeter or less, typically two perforations per square centimeter of perforated surface or less. For the present invention, the perforated surface is desirably a major surface of the polymeric foam.

The diameter or width of needles used for perforating the initial polymeric foam help define the size of the perforation channel the needle introduces into the initial polymeric foam. Typically, the diameter or width of needles used for perforating the initial polymeric foam is one millimeter or larger, preferably two millimeters or larger. Large needle sizes are desirable because they open up the foam to air flow better. However, if the needle size gets too large, it can damage the foam. The diameter or width of needles used for perforating the initial polymeric foam is generally six millimeters or smaller and preferably five millimeters or smaller.

Laminate two more perforated polymeric foams together such that a perforated surface of one perforated foam adheres to a perforated surface of another perforated polymeric foam to form an acoustical polymeric foam of the present invention. Notably, initial and perforated polymeric foams that make up an acoustical polymeric foams of the present invention may be identical to one another or may differ in any one or any combination of more than one characteristic including polymer composition, open cell content, thickness, and perforation density.

It is desirable to maximize fluid communication between perforation channels in adjoining perforated foams during the lamination process. Fluid communication increases when perforation channels from adjoining perforated foams align with one another or when the perforation channels share a common cell or common cells. Perforation channels share a common cell if the channels are open to the same cell. Perfect linear alignment of each and every perforation channel in a perforated polymeric foam with a perforation channel of an adjoining perforated polymeric foam is virtually impossible. Therefore, a characteristic of the laminated acoustical polymeric foam that is that fewer than all, and typically few if any, perforation channels extend in a continuous linear fashion from one surface of the acoustical polymeric foam to an opposing surface of the acoustical polymeric foam without experiencing a narrowing or restriction of the perforation channel due to less than perfect alignment of perforation channels between perforated polymeric foams. Generally, fluid communication between perforation channels of adjoining perforated polymeric foams in acoustical polymeric foams of the present invention occurs through partial alignment of the perforation channels, sharing a common cell, or both partial alignment and sharing a common cell.

Laminate perforated polymeric foams to one another by adhering them together using a technique that results in a gas permeable interface between perforated polymeric foams. Gas permeable adhesives such as spray-on adhesives and porous or perforated membrane adhesives can be used, but are not necessary.

Melt welding is particularly desirable method of adhering perforated polymeric foams together. Melt weld two perforated polymeric foams together by heating a perforated surface of one or both of the polymeric foams to a temperature sufficient to soften the polymer composition in the polymer matrix of the foam (typically to or above the glass transition temperature of the polymer composition) to form a softened perforated surface. While the polymer composition is still in the softened state contact the softened perforated surface(s) together and apply pressure. As the softened perforated surfaces cool they adhere to one another.

Melt welding has several advantages over other lamination methods. One advantage is that heating a perforated surface of a perforated polymeric foam to a softened state causes skin on the perforated surface to retract and expose cells beneath the skin. This is advantageous because it opens up cells to perforation channels from an adjoining perforated foam thereby facilitating fluid communication between perforation channels of the two perforated foams that share the cell (that is, share a common cell) without having to be perfectly or even partially linearly aligned. Another advantage of melt welding is that it is easily employed in a lamination process without having to introduce a separate adhesive component or adhesive application step. Desirably, melt weld adjoining perforated polymeric foams together in an absence of adhesives other than softened polymer composition of one or more of the perforated polymeric foams between perforated surfaces being adhered together.

Heat a perforated surface in a melt welding step using any method of applying heat. Particularly useful is application of hot air against the perforated surface. Other methods of heating a perforated surface to soften it for melt welding include exposing the surface to radiant infrared heat or contact with a heated surface. Non-contact methods of heating such as application of hot air or radiant infrared heat are desirable over contact methods because they do not smear the softened polymer surface or restrict the polymer surface skin from retracting as it softens.

It is desirable during the lamination process to maximize the number of perforation channels in each perforated polymeric foam that has fluid communication all the way through the acoustical polymeric foam. While achieving perfect linear alignment of perforation channels between perforated foams is virtually impossible, fluid communication is alternatively obtained by having perforation channels partially align or share cells in common.

The resulting acoustical polymeric foam of the present invention comprises two or more and can have three or more, four or more, even five or more perforated polymeric foams laminated together. Each perforated polymeric foam has perforation channels that extend in a continuous linear fashion all the way through the perforated polymeric foam. However, fewer than all of the perforation channels of any of the perforated polymeric foams extend in a continuous linear fashion without restriction all the way through the acoustical polymeric foam comprising the perforated polymeric foams.

Desirably, the acoustical polymeric foam is free of adhesive between perforated polymeric foams.

Acoustical polymeric foams of the present invention desirably have the following properties: a density of 27 kilograms per cubic meter ($kg/m^3$) or more, preferably 28 $kg/m^3$ or more and typically 35 $kg/m^3$ or less and a vertical compressive strength at 25% compression of 20 kilopascals (kPa) or more, typically 30 kPa or more and generally 60 kPa or less. Measure density using the general procedure of ASTM method D1622. Measure vertical compressive strength according to ASTM D3575.

Surprisingly, acoustical polymeric foams of the present invention have comparable or better acoustical activity relative to non-laminated perforated polymeric foams of similar composition and thickness. However, the acoustical polymeric foams of the present invention require significantly less cure time and can utilize simpler, less costly methods of perforation during their manufacture.

EXAMPLES

The following examples illustrate embodiments of the present invention rather than necessarily define the full scope of the present invention.

For each of the examples below measure acoustical performance according to ASTM E-1050. The apparatus for measuring acoustical performance is a Model 4206 acoustical impedance tube and Model 3555 signal analyzer, both form Brueel and Kjaer A/S, Naerum, Denmark. Measure a normal incidence sound absorption coefficient for each foam.

Comparative Example A

Thick Perforated Foam

Prepare 100 test samples from QUASH™ FR2000 sound management foam having a thickness of 61-63 millimeters and a density of 30-34 kg/m$^3$ (QUASH is a trademark of The Dow Chemical Company). Perforate all the way through the samples perpendicular to a major surface using two millimeter diameter needles at a perforation density of one perforation per square centimeter. Perforate the samples using 1035 ModernTech equipment, which employs several rows of needles perforating the foam in a sewing machine technique. Measure the acoustical performance of each of the 100 samples and take the bottom envelope of the values to serve as the performance of Comparative Example A.

FIG. 1 illustrates the sound absorption spectrum for Comparative Example A. The average noise reduction coefficient (NRC) for Comparative Example A is 0.440.

Comparative Example B

Laminated Foam with Subsequent Perforation

Prepare 11 samples by laminating four sheets of PLF QUASH™ FR2000 Natural sound management foam together, each sheet having a thickness of 15-16.5 millimeters, to produce samples having a thickness of 60-62 millimeters in thickness. Laminate the sheets using a Megamold 2800 lamination line that applies air heated to 400-450° C. to the surface of the sheets to soften the polymer and then compresses the foam sheets together. The foam sheets have a density of 30-34 kg/m$^3$. Perforate the laminated in a manner similar to that used to prepare Comparative Example A. Use two millimeter diameter needles and perforate all the way through the foam and perpendicular to a major surface of the foam at a perforation density of one perforation per square centimeter. Measure the acoustical performance of each of the 11 laminated foams and average their performance together to serve as the performance of Comparative Example B.

FIG. 1 illustrates the sound absorption spectrum for Comparative Example B. The average NRC for Comparative Example B is 0.642. Comparative Example B illustrates a higher NRC for a laminated foam than a monolithic foam of similar thickness and composition.

Example 1

Laminated Perforated Foams

Prepare Example 1 by perforating four sheets of PLF QUASH™ FR2000 Natural sound management foam, each sheet having a thickness of 16 millimeters and a density of 32 kg/m$^3$. Perforate the foam sheets all the way through the foam sheet and perpendicular to a major surface using a roller affixed with two millimeter diameter needles positioned in rows on the roller such that the perforation density on the foam sheet is one perforation per square centimeter. Perforate all the way through the foam sheets while simultaneously compressing the foam sheets. Eject the foam sheets from the needles of the roller using a reed consisting of metal rods extending between rows of needles and extending from adjacent to the roller to a distance from the roller parallel to the direction the foam is traveling under the roller. The portions of the metal rods proximate to the roller reside between the roller and the perforated polymeric foam sheet as the perforated foam sheet exits from under the roller. The metal rods eject the foam sheet from the needles. The foam sheet then travels under the reed after passing under the roller. The reed is wide enough to span the entire width of the foam sheet.

Laminate the four sheets together so the perforation channels extend in a parallel direction, perpendicular to the direction of perforation. Laminate the four sheets together, one major surface of one sheet to a major surface of another sheet, by first softening the polymers of a major surface of each foam sheet using a Teflon™-coated heating blade at 200° C. and then compressing the softened surfaces of the foam sheets together (Teflon is a trademark of DuPont). The resulting laminated foam, Example 1, is 61 millimeters thick. Fewer than all, if any, of the perforation channels in any perforated polymeric foam extend in a continuous linear fashion without restriction all the way through the acoustical polymeric foam of Example 1.

Measure the acoustical performance for Example 1. FIG. 1 illustrates the sound absorption spectrum for Example 1 and the surprising result of the present invention. The average NRC for Example 1 is 0.664. Example 1 has a higher NRC than either Comparative Example A or Comparative Example B, indicating a higher overall acoustical dampening ability then either of the comparative examples. The larger acoustical absorption coefficient of Example 1 is evident at nearly all tested frequencies in FIG. 1.

The invention claimed is:

1. A process for making an acoustically active polymeric foam comprising the following steps:
   (a) providing at least two initial polymeric foams, each having opposing major surfaces;
   (b) perforating the initial polymeric foams through one major surface all the way the foam and through the opposing major surface to form perforated polymeric foams having perforation channels that extend in a continuous and linear fashion all the way through the perforated polymeric foam; and
   (c) laminating the perforated polymeric foams together such that a perforated surface of one perforated polymeric foam adheres to a perforated surface of another perforated polymeric foam;
wherein step (b) comprises compressing the initial polymeric foams into a compressed state and then perforating the initial polymeric foams while in a compressed state and wherein perforating occurs by applying a roller with multiple spike extending off from the roller into each initial polymeric foam such that the spikes penetrate through the initial polymeric foam as the initial polymeric foam travels under the roller.

2. The process of claim 1, wherein the perforated polymeric foams have an average cell size of at least four millimeters according to ASTM D3576.

3. The process of claim 1, wherein the initial polymeric foams have an open cell content of less than 30 percent according to ASTM method D6226-05.

4. The process of claim 1, wherein the initial polymeric foams each have a thickness of 30 millimeters or less.

5. The process of claim 1, wherein the roller has a pre-perforated foam side and a perforated foam side and a reed of rods ejects the perforated foam from the spikes by comprising rods that extend up to the roller from the perforated foam side and reside between the roller and perforated polymeric foam.

6. The process of claim 1, wherein step (b) introduces perforations sufficient to produce a perforated polymeric foam has a perforation density of at least 0.8 perforations per square centimeter of perforated major surface.

7. The process of claim 6, wherein the perforation density is two perforations or less per square centimeter of perforated major surface.

8. The process of claim 1, wherein step (c) comprises heating one or both major surfaces being adhered together sufficiently to soften the perforated polymeric foam at the surface or surfaces and then contacting the major surfaces of the perforated polymeric foams together.

9. The process of claim 8, wherein step (c) comprises melt welding the perforated polymeric foam major surfaces together in an absence of any adhesive between perforated surfaces of the perforated polymer foams other than the softened polymer composition of one or more of the perforated polymer foams.

* * * * *